United States Patent [19]

Shimizu et al.

[11] Patent Number: 5,196,164
[45] Date of Patent: Mar. 23, 1993

[54] METHOD OF PREVENTING POLYMER SCALE FORMATION

[75] Inventors: Toshihide Shimizu, Urayasu; Ichiro Kaneko; Mikio Watanabe, both of Ibaraki, all of Japan

[73] Assignee: Shin-Etsu Chemical Co., Ltd., Tokyo, Japan

[21] Appl. No.: 391,199

[22] Filed: Aug. 9, 1989

[30] Foreign Application Priority Data

Aug. 10, 1988 [JP] Japan ................................. 63-199119
Aug. 10, 1988 [JP] Japan ................................. 63-199120

[51] Int. Cl.$^5$ ............................................. C08F 2/00
[52] U.S. Cl. .......................................... 422/1; 422/241; 427/230; 526/62
[58] Field of Search ................. 422/1, 241; 427/230; 526/62

[56] References Cited

U.S. PATENT DOCUMENTS

| | | | |
|---|---|---|---|
| 3,959,235 | 5/1976 | Nishigaki et al. | 526/62 |
| 4,173,696 | 11/1979 | Koyanagi et al. | 526/74 |
| 4,263,421 | 4/1981 | Jones et al. | 526/62 |
| 4,757,124 | 7/1988 | Koyanagi et al. | 526/62 |
| 4,933,399 | 6/1990 | Shimizu et al. | 526/62 |

FOREIGN PATENT DOCUMENTS

| | | |
|---|---|---|
| 0320227 | 6/1989 | European Pat. Off. . |
| 2318898 | 2/1977 | France . |
| 2320952 | 3/1977 | France . |
| 2378045 | 8/1978 | France . |

Primary Examiner—Robert J. Warden
Assistant Examiner—Timothy M. McMahon
Attorney, Agent, or Firm—Oblon, Spivak, McClelland, Maier & Neustadt

[57] ABSTRACT

This process is a method of preventing polymer scale formation in a polymerization vessel during the polymerization of a monomer having an ethylenically unsaturated double bond. The inner wall surface of a polymerization vessel is coated with a water-based coating solution containing (A) a water-soluble anionic dye and (B) at least one water-insoluble cationic dye or water-insoluble nitrogen-containing organic compound, where the water-based coating solution has a pH of 7 or less. The coating solution is applied and then dried to form a coating.

21 Claims, No Drawings

METHOD OF PREVENTING POLYMER SCALE FORMATION

BACKGROUND OF THE INVENTION

1. Field of the Invention

The present invention relates to a method of effectively preventing polymer scale from sticking, and particularly to a method of preventing polymer scale from sticking in a polymerization vessel during the polymerization of monomers having an ethylenically double bond.

2. Description of the Prior Art

In processes of preparing polymers by polymerizing monomers in a polymerization vessel, known to arise is the problem that the polymer sticks on inner wall surface and so forth of the polymerization vessel in the form of scale. Once the scale of polymer sticks on the inner wall surface and so forth of the polymerization vessel, much labor and time are required as a result to remove the scale of polymers. Disadvantages may also result such that the yield of polymers and the cooling capacity of the polymerization vessel are lowered, and the sticked scale of polymers may peel from the surfaces to mix into a product, and the quality of manufactured polymers are thereby made poor.

As methods of preventing polymer scale from sticking on the inner wall surface and so forth of a polymerization vessel, there have been hitherto proposed, for example, a method in which a polar compound, a dye, a pigment or the like is coated on the inner wall surface (Japanese Patent Publication (KOKOKU) Nos. 30343/1970 and 30835/1970), a method in which an aromatic amine compound is coated (Japanese Pre-examination Patent Publication (KOKAI) No. 50887/1976), and a method in which a reaction product of a phenolic compound with an aromatic aldehyde is coated (Japanese Pre-examination Patent Publication (KOKAI) No. 54317/1980).

These are effective in preventing polymer scale from sticking, when vinyl halide monomers such as vinyl chloride or monomer mixtures mainly comprised of said monomers and containing a small amount of monomers copolymerizable therewith are polymerized.

However, in instances in which the monomers to be polymerized comprise other monomers having an ethylenically double bond such as styrene, alpha-methylstyrene, acrylate and acrylonitrile, these monomers have so large a dissolving power against the coating formed by the above sticking-preventing methods that part or the whole of the coating may be dissolved away, so that it becomes impossible to effectively prevent polymer scale from sticking on the inner wall surface and so forth of a polymerization vessel. This sticking of scale particularly tends to occur when the polymerization vessel is made of stainless steel.

SUMMARY OF THE INVENTION

Accordingly, an object of this invention is to provide a method that can effectively prevent polymer scale from sticking on the inner wall surface and so forth of a polymerization vessel, in the polymerization of not only the vinyl halide monomers but also a vast range of monomers having an ethylenically double bond.

Thus, as a means for solving the above problems, this invention provides a method of preventing polymer scale formation in a polymerization vessel during the polymerization of a monomer having an ethylenically double bond, wherein said polymerization is carried out in a polymerization vessel in which its inner wall surface has been previously coated with a water-based coating solution containing (A) a water-soluble anionic dye and (B) at least one member selected from the group consisting of water-insoluble cationic dyes and water-insoluble nitrogen-containing organic compounds and having a pH of 7 or less and then dried to form a coating.

According to this invention, it is possible to effectively prevent polymer scale from sticking on the inner wall surface and so forth of a polymerization vessel in the polymerization of monomers having an ethylenically double bond. In particular, it is possible to prevent polymer scale from sticking even in the polymerization of a polymerization system containing monomers having a high dissolving power as exemplified by styrene, alpha-methylstyrene, acrylate and acrylonitrile. The coating operation on the inner wall surface and so forth of a polymerization vessel may be carried out for every batch or once in several batches, so that the polymerization vessel can be repeatedly used without causing the polymer scale to stick on the inner wall surface and so forth of a polymerization vessel. The coating solution, which is the water-based solution containing only a small amount of organic solvent, can also have less toxicity ascribable to organic solvents and have a high safety.

DETAILED DESCRIPTION OF PREFERRED EMBODIMENTS OF THE INVENTION

In the method of this invention, it is essential to use said (A) water-soluble anionic dye and said (B) at least one member selected from the group consisting of water-insoluble cationic dyes and water-insoluble nitrogen-containing organic compounds in combination to attain the aimed scale preventing effect.

The water-soluble anionic dye of (A) used as one of scale-preventive agents in this invention may include, for example, sulfonic acid dyes, carboxylic acid dyes, and dyes having both properties of sulfonic acids and carboxylic acids.

The sulfonic acid dyes include, for example, C.I. Acid Yellow 38; C.I. Food Yellow 3; C.I. Reactive Yellow 3; C.I. Direct Orange 2, 10, 26; C.I. Acid Red 18, 52, 73, 80; C.I. Direct Red 31, 186, 92; C.I. Direct Violet 1, 22; C.I. Acid Violet 11, 78; C.I. Mordant Violet 5; C.I. Direct Blue 1, 6, 71, 86, 106; C.I. Reactive Blue 2, 4, 18; C.I. Acid Blue 1, 40, 59, 113, 116, 158; C.I. Acid Black 1, 2, 124; C.I. Direct Black 19, 32, 38, 77; C.I. Solubilized Vat Black 1; C.I. Fluorescent Brightening Agent 30, 32; C.I. Acid Orange 3, 7; and C.I. Direct Green 1.

The carboxylic acid dyes and dyes having both a sulfonic acid group and a carboxylic acid group include, for example, C.I. Direct Yellow 1; C.I. Direct Red 1; C.I. Mordant Black 5; C.I. Azoic Brown 2; C.I. Direct Brown 1, 37, 101; C.I. Direct Green 26; C.I. Acid Red 87; C.I. Mordant Yellow 26; and C.I. Direct Orange 97.

Among the above water-soluble anionic dyes, preferred are C.I. Acid Black 2, C.I. Acid Yellow 38, C.I. Acid Violet 11, C.I. Acid Blue 158, C.I. Direct Black 38, C.I. Direct Blue 1, C.I. Direct Green 1 C.I. Acid Red 52, C.I. Direct Brown 37, C.I. Acid Black 1, C.I. Direct Yellow 1, C.I. Direct Orange 97, C.I. Reactive Yellow 3, C.I. Direct Red 92, C.I. Solubilized Vat Black 1, C.I. Acid Blue 40, C.I. Acid Blue 113, C.I.

Food Yellow 3, C.I. Direct Orange 2, C.I. Acid Red 73, C.I. Acid Blue 116, C.I. Acid Black 1, C.I. Acid Blue 1, C.I. Direct Red 92, C.I. Direct Black 32, C.I. Direct Brown 101, C.I. Acid Red 87, C.I. Acid Violet 78, C.I. Direct Orange 97, C.I. Direct Green 1, C.I. Acid Orange 3, C.I. Mordant Yellow 26, C.I. Acid Black 124, C.I. Direct Blue 6, C.I. Acid Blue 158, C.I. Direct Violet 78 and C.I. Acid Red 18. Particularly preferred are C.I. Acid Black 2, C.I. Acid Yellow 38, C.I. Acid Blue 158, C.I. Direct Black 38, C.I. Direct Green 1, C.I. Direct Brown 37, C.I. Food Yellow 3, C.I. Acid Red 18, C.I. Acid Red 73, C.I. Acid Blue 1, C.I. Acid Red 87 and C.I. Acid Orange 3.

These Water-soluble anionic dyes may be used singly or in combination of two or more kinds.

As (B) component stated above, used is at least one compound out of water-insoluble cationic dyes and water-insoluble nitrogen-containing organic compounds.

The water-insoluble cationic dye includes, for example, C.I. Solvent Yellow 2, 6, 14, 15, 16, 19, 21, 33, 56, 61, 80; Solvent Orange 1, 2, 14, 37, 40, 44, 45; C.I. Solvent Red 1, 3, 8, 23, 24, 25, 27, 30, 49, 81, 82, 84, 100, 121; C.I. Solvent Violet 8, 13, 14, 21, 27; C.I. Solvent Blue 2, 11, 12, 25, 35, 36, 55, 73; C.I. Solvent Green 3; C.I. Solvent Brown 2, 5, 29, 37; C.I. Solvent Black 3, 5, 7, 22, 23; C.I. Acid Black 123; C.I. Disperse Yellow 1, 3, 4, 5, 7, 23, 31, 33, 42, 49, 50, 51, 54, 56, 60, 61, 64, 66, 71, 72, 76, 78, 79; C.I. Disperse Orange 1, 3, 5, 11, 13, 20, 21, 30, 32, 41, 43, 45, 46, 49, 50, 51; C.I. Disperse Red 1, 4, 5, 7, 11, 12, 13, 15, 17, 43, 52, 53, 54, 55, 56, 58, 59, 60, 65, 72, 73, 74, 75, 76, 80, 82, 84, 88, 90, 91, 92, 97, 99, 100, 101, 103, 104, 113, 116, 117, 122, 125, 126, 127, 128, 129; C.I. Disperse Violet 1, 4, 8, 10, 18, 23, 24, 26, 28, 30, 33, 37, 38; C.I. Disperse Blue 1, 3, 5, 6, 7, 20, 26, 27, 43, 44, 52, 54, 55, 56, 58, 60, 61, 62, 64, 72, 73, 75, 79, 81, 85, 87, 88, 90, 92, 94, 97, 98, 99, 103, 104, 105, 106, 108; C.I. Disperse Brown 3, 5; C.I. Disperse Black 1, 2, 10, 26, 27, 28, 29, 30, 31; and C.I. Fluorescent Brightening Agent 170, 135, 162, 163, 164, 121, 172, 91.

These water-insoluble cationic dye can be used singly or in combination of two or more kinds.

Among the above water-insoluble cationic dyes, preferred are C.I. Solvent Black 22, C.I. Solvent Black 3, C.I. Solvent Black 5, C.I. Solvent Yellow 2, C.I. Solvent Violet 8, C.I. Solvent Brown 3, C.I. Solvent Black 7, C.I. Solvent Red 24, C.I. Solvent Blue 2, C.I. Solvent Blue 25, C.I. Disperse Red 56, C.I. Disperse Orange 5, C.I. Solvent Orange 45, C.I. Disperse Black 1, C.I. Disperse Black 26, C.I. Solvent Orange 14, C.I. Solvent Orange 100, C.I. Disperse Black 30, C.I. Solvent Yellow 56, C.I. Solvent Blue 35, C.I. Solvent Blue 55, C.I. Disperse Red 100, C.I. Disperse Red 128 and C.I. Solvent Black 23. Particularly preferred are C.I. Solvent Black 3, C.I. Solvent Black 5, C.I. Solvent Violet 8, C.I. Solvent Brown 3, C.I. Solvent Black 7, C.I. Solvent Red 24, C.I. Solvent Blue 25, C.I. Disperse Orange 5, C.I. Disperse Orange 45, C.I. Solvent Orange 100 and C.I. Disperse Black 30.

The water-insoluble nitrogen-containing organic compound which may be used as (B) component includes, for example, nitrogen-containing organic compounds containing neither carboxyl group nor sulfonic acid group and having 5 or more conjugated $\pi$-bonds in the molecule, and specifically may be exemplified by the following compounds:

Benzene derivatives such as 4,4'-diaminobiphenyl, 3,3'-diaminobiphenyl, 2,2'-diaminobiphenyl, 4,4'-bis-dimethylaminodiphenylmethane, diphenylamine, triphenylamine, 4-aminodiphenylamine, p,p'-tetraethyldiaminodiphenylmethane, 4,4'-diaminotriphenylmethane, and 4,4',4''-triaminotriphenylmethane; naphthalene derivatives such as alpha-naphthylamine, 1,8-diaminonaphthalene, 1,5-diaminonaphthalene, N-methylnaphthylamine, N-ethylnaphthylamine, N,N-dimethylnaphthylamine, N,N-diethylnaphthylamine, N-methyl-N-ethylnaphthylamine, N-phenylnaphthylamine, 1,1'-dinaphthylamine, 2,2'-dinaphthylamine, N-benzylnaphthylamine, thioacetoaminonaphthalene, N-benzoylnaphthylamine, 1,4-diamino-2-methylnaphthalene, alpha-naphthylhydrazine, 1,2:7,8-dibenzocarbazole, 3,4:5,6-dibenzocarbazole, 4,4'-diamino-1,1'-binaphthyl, 2,2'-diamino-1,1'-binaphthyl, N'-phenyl-N-alpha-naphthylhydrazine, 4-(p-aminophenyl)-1-naphthylamine, 1-alpha-naphthylthiosemicarbazide, 1,2:5,6-dibenzophenazine, naphto-2',3':4,5-triazole, 2,3-dihydrazinonaphthalene, N-acetyl-alpha-naphthylnitrosoamine, N-ethyl-alpha-naphthylnitrosoamine, N-phenyl-alpha-naphthylnitrosoamine, alpha,alpha'-dinaphthylnitrosoamine, 1-aminomethylnaphthalene, N-methyl(-naphthylmethyl)amine, N,N'-dimethyl(naphthylmethyl)amine, N-phenyl(naphthylmethyl)amine, N-benzyl(napthylmethyl)amine, and tri(naphthylmethyl)amine; quinones such as 2-anilino-1,4-naphthoquinone, 2-anilino-1,4-naphthoquinone-4-anyl, 2-anilino-1,4-naphthoquinonedianyl, 2-anilino-1,4-naphthoquinone-4-(p-dimethylaminononanyl), alpha-aminoanthraquinone, and beta-aminoanthraquinone; and heterocyclic compounds such as 2-phenylhydrazinothiazole, quinoline, 2-methylquinoline, 3-methylquinoline, 4-methylquinoline, 2-phenylquinoline, 3-phenylquinoline, 4-phenylquinoline, 2,3'-biquinoline, 2,5'-biquinoline, 2,7'-biquinoline, 2-aminoquinoline, 3-aminoquinoline, 4-aminoquinoline, 5-aminoquinoline, 2-dimethylaminoquinoline, 6-dimethylaminoquinoline, 7-dimethylaminoquinoline, 4-anilinoquinoline, isoquinoline, 1-phenylisoquinoline, 3-phenylisoquinoline, 1,1'-biisoquinoline, 3,3'-biisoquinoline, 5,5'-biisoquinoline, 6,7-methylenedioxyisoquinoline, 1-aminoisoquinoline, 3-aminoisoquinoline, 4-aminoisoquinoline, 5-aminoisoquinoline, acridine, 1-aminoacridine, 2-aminoacridine, 3-aminoacridine, 4-aminoacridine, phenanthridine, 6-methylphenanthridine, 6-chlorophenanthridine, 6-bromophenanthridine, 6-phenylphenanthridine, 1,5-anthrazoline, 1,10-phenanthroline, nathylidine, phenoxazine, phenothiazine, phthaliazine, 2-chloroquinazoline, 4-chloroquinazoline, quinoxaline, alpha-chloroquinoxaline, 2,3-dichloroquinoxaline, 2,3-diaminoquinoxaline, 2-aminoquinoxaline, phenazine, phenazine-5-oxide, 1-aminophenazine, 5,10-dihydrophenazine, 5-methyl-5,10-dihydrophenazine, 2,4-diamino-6-phenyl-s-triazine, 2-methyl-2,4,6-triphenyl-1,2-dihydro-s-triazine, 5,6-diphenyl-as-triazine, 2,6-diphenyl-2,3,4,5-tetrahydro-as-triazine, 5,6-diphenyl-as-triazin-3-ol, 3-amino-5-phenyl-as-triazine, 1,3,4-benzotriazine, 1,2,4-benzotriazin-3-ol, 2,3-diphenylosotetrazine, 5,6-dimethyl-2,3-diphenylosotetrazine, 1,3-diphenyl-1,4,5,6-tetrahydro-s-tetrazine, 3,6-diphenyl-1,2,-dihydro-s-tetrazine, nicotyrine, nicotelline, galipine, cusparine, galipoline, dictamnine, gamma-fagarine, cinchonine, evoxantidine, xanthoxoline, evoxanthine, xanthoevodine, melicopine, melicopidine, acronycine, laudanosine, laudanine, codamine, coclaurine, d-isococlaurine, corpaverine, bicuculline, adlumine, adlumidine, corlumine, corlumidine, capnoidine, corycavamine, corycavidine, ochrobirine, nitidine, oxynitidine, tetramethoxy-N-methyldihydroalpha-naphthaphenanthridine, sanguinarine, chelidonine, oxychelidonine, methoxychelidonine, oxysanguinarine, rubremetine, psychotrine, o-methylpsychotrine, cephaeline, emetamine, bulbocapnine, laurotetanine, morphothebaine, cryptopleurine, thyrophorine, harmine, harmaline, harmane, evodiamine, rutecarpine, reserpine, sempervirine, reserpinine, ajmalicine, reserpiline, serpentine, calycanine, 6-oxocanthine, erypticine, and cyptolepine.

Among the above water-insoluble nitrogen-containing organic compounds, preferred are 1,8-diaminonaphthalene, alpha-naphthylamine, quinoline, 2-aminoisoquinoline, 1,10-phenanthroline, 1,5-diaminonaphthalene, alpha-aminoanthraquinone, 4-(p-aminophenyl)-1-naphthylamine, 1-alpha-naphthylthiosemicarbazide, phenoxazine, 1,1'-biisoquinoline, phenanthridine, 2,3-diaminophenazine, oxychelidonine, 2-aminoquinoline, 3-aminoquinoline, 1-aminoacridine, phenoxazine, 2-anilino-1,4-naphthoquinone, beta-aminoanthraquinone, 1,4-diamino-2-methylnaphthalene, alpha,alpha'-dinaphthylnitrosoamine, nicotyrine and 1,1'-dinaphthylamine. Particularly preferred are 1,8-diaminonaphthalene, alpha-naphthylamine, quinoline, 1,10-phenanthroline, 1,5-diaminonaphthalene, 1-alpha-naphthylthiosemicarbazide, 2,3-diaminophenazine, 1-aminoacridine, 2-anilino-1,4-naphthoquinone and beta-aminoanthraquinone.

These water-insoluble nitrogen-containing organic compound can be used singly or in combination of two or more kinds.

As (B) component, either one or both of the water-insoluble cationic dye and water-insoluble nitrogen-containing organic compound (these are hereinafter generically referred to "water-insoluble compound") are used.

The coating solution needs have a pH of 7 or less, preferably 1.5 to 6.0, which pH enable the above (A) water-soluble anionic dye and the above (B) water-insoluble compound to undergo ionic reaction quickly after the coating solution is applied and then dried, to form a water-insoluble and stable coating.

The water-based coating solution can be prepared by mixing an aqueous solution of the water-soluble anionic dye and an organic solvent solution obtained by dissolving the water-insoluble compound in a suitable organic solvent.

In the method of this invention, a coating for preventing polymer scale from sticking on the inner wall surface and so forth of a polymerization vessel is formed by applying the water-based coating solution to the inner wall surface of the polymerization vessel and, optionally, other parts with which said monomer comes into contact during polymerization, as exemplified by the surfaces of a stirrer shaft, a stirring blade, a header, a baffle and a search coil and the inner surfaces of a condenser. In the case where the (B) water-insoluble compound is mainly comprised of the water-insoluble cationic dye, the coating solution has preferably a pH of 1.5 to 3.5. The solvent used for dissolving the (B) water-insoluble organic compound may preferably include organic solvents highly compatible with water, as exemplified by alcohols such as methanol, ethanol, propanol, butanol, 2-methyl-1-propanol, 2-butanol, 2-methyl-2-propanol, 3-methyl-1-butanol, 2-methyl-2-butanol, and 2-pentanol; ketones such as acetone, methyl ethyl ketone, and methyl isobutyl ketone; ethers such as 4-methyldioxolane, and ethylene glycol diethyl ether; esters such as methyl formate, ethyl formate, methyl acetate, and methyl acetoacetate; furans such as tetrahydrofuran, furfural, furfuryl alcohol, and tetrahydrofurfuryl alcohol; and non-protonic solvents such as acetonitrile, formamide, dimethylformamide, dimethylsulfoxide, and N-methylpyrrolidone. These are used either singly or in combination of two or more kinds.

There are no particular limitations on the concentration of the total of the above (A) water-soluble anionic dye and (B) water-insoluble compound so long as the coating formed can get a coating weight as described later, but they are usually used in a total concentration of preferably from 0.01 to 5% by weight, and more preferably from 0.05 to 2% by weight. The weight ratio of (A) water-soluble anionic dye/(B) water-insoluble compound in the water-based coating solution may preferably be usually from 100/0.1 to 100/1,000, and more preferably from 100/3 to 100/100. If this weight ratio is too small, the dye is liable to form agglomeration and precipitation, so that it is impossible to obtain a uniform coating. If the weight ratio is too large, the resulting coating is likely to be dissolved by water for washing even after the coating solution has been applied and dried on the inner wall surface and so forth of a polymerization vessel.

The pH of the water-based coating solution can be adjusted according to any of the following methods, for instance.

(1) A method in which the aqueous solution of the water-soluble anionic dye to which a pH adjuster has been added in an amount that makes the water-based coating solution pH 7 or less, and the organic solvent solution of the water-insoluble compound are mixed.

(2) A method in which the organic solvent solution of the water-insoluble compound to which a pH adjuster has been added in an amount that makes the water-based coating solution pH 7 or less, and the aqueous solution of the water-soluble anionic dye are mixed.

(3) A method in which the organic solvent solution of the water-insoluble compound and the aqueous solution of the water-soluble anionic dye are mixed, and thereafter a pH adjuster is added to the mixed solution.

The pH adjuster used includes, for example, sulfuric acid, hydrochloric acid, phosphoric acid, nitric acid, carbonic acid, perchloric acid, molybdic acid, tungstic acid, formic acid, acetic acid, oxalic acid, lactic acid, maleic acid, glycolic acid, thioglycolic acid, and phytic acid. Phytic acid is preferred. These may be previously formed into aqueous solution so that they can be conveniently used for the purpose of adjusting the pH.

In one of the most preferred embodiments, the (A) water-soluble anionic dye is C.I. Acid Black 2, the (B) water-insoluble compound is C.I. Solvent Black 3, 5 or 7, the pH adjuster is phytic acid or perchloric acid, and the pH of the coating solution is in the range of from 1.5 to 6.0.

There are also no particular limitations on the weight ratio of the water/the organic solvent in the water-based coating solution so long as a uniform water-based coating solution can be obtained, but preferably the weight ratio is generally from 100/1 to 100/1,000, and more preferably from 100/3 to 100/100. In the case where the (B) water-insoluble compound is mainly comprised of the water-insoluble cationic dye, usually the above weight ratio of the water/the organic solvent is preferably from 100/1 to 100/30, and more preferably from 100/3 to 100/10.

In the method of the present invention, the water-based coating solution is applied on the inner wall surface and so forth of a polymerization vessel, followed by drying to form a coating. As methods of applying and drying the water-based coating solution on the inner wall surface and so forth of a polymerization vessel, any methods may be employed. For example, a method in which, after the solution is applied, air heated to a suitable temperature is blown to the coated surface to dry it, and a method in which the inner wall surface of a polymerization vessel and other parts with which the monomer comes into contact during polymerization are previously heated to about 30° to 90° C., and the water-based coating solution is directly applied on the heated inner wall surface and so forth of the polymerization vessel to dry the coated surface. After dried, the coated surfaces are washed with water if necessary.

The method of applying the coating solution is not particularly limited, and may be inclusive of typically of the brush coating, spray coating, the method of filling the polymerization vessel with the water-based coating solution followed by withdrawal thereof, and otherwise the automatic coating methods as disclosed in Japanese Pre-examination Publication (KOKAI) Nos. 61,001/1982, 36,288/1980 and 11,303/1984, Japanese Pre-examination Publication (KOHYO) Nos. 501,116/1981 and 501,117/1981.

Moreover, preferably, the water-based coating solution is applied to parts of recovery system for an unreacted monomer with which the unreacted monomer may come into contact, for example, the inner surfaces of monomer distillation columns, condensers, monomer stock tanks and so forth. Scale formation can be thereby prevented at these parts.

The water-based coating solution may be applied in a coating weight of usually from about 0.001 to 5 g/m$^2$ after dried, on the surfaces of the inner wall, stirrer and so forth of a polymerization vessel.

After the formation of the coating by applying the water-based coating solution on the inner wall surface of a polymerization vessel and other parts with which the monomer comes into contact during polymerization, a monomer having an ethylenically double bond, a polymerization initiator, and other necessary additives as exemplified by a dispersing agent for the monomer may be charged into the polymerization vessel, followed by carrying out polymerization, according to conventional procedures.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or esters or salts of these; maleic acid or fumaric acid, and esters or anhydrides thereof; diene monomers such as butadiene, chloroprene and isoprene; aromatic vinyl compounds such as styrene and alpha-methylstyrene; as well as acrylates, acrylonitrile, halogenated vinylidenes, and vinyl ethers.

The method of this invention is effective regardless of the materials constituting the inner wall and so forth of a polymerization vessel. That is this method is effective for the inner wall and so forth which are made of any materials as exemplified by stainless steel and glass for lining.

There are no particular limitations on the form of the polymerization to which the method of this invention can be applied. The invention is effective in any forms of polymerization such as suspension polymerization, emulsion polymerization, solution polymerization and bulk polymerization.

Accordingly, any additive materials that are commonly added in a polymerization system can be used without any limitation. More specifically, the method of this invention can effectively prevent polymers from sticking, even in polymerization systems in which such additives are present as exemplified by suspension agents such as partially saponified polyvinyl alcohol, methyl cellulose and polyacrylate; solid dispersants such as calcium phosphate and hydroxyapatite; anionic emulsifying agents such as sodium lauryl sulfate, sodium dodecylbenzenesulfonate and sodium dioctylsulfosuccinate; nonionic emulsifying agents such as sorbitan monolaurate and polyoxyethylene alkylether; fillers such as calcium carbonate and titanium oxide; stabilizers such as tribasic lead sulfate, calcium stearate, dibutyltin dilaurate and dibutyltin mercaptide; lubricants such as rice wax and stearic acid; plasticizers such as DOP and DBP; chain transfer agents such as trichloroethylene and mercaptans; pH adjusters; and polymerization catalysts such as diisopropyl peroxydicarbonate, $\alpha,\alpha'$-azobis-2,4-dimethylvaleronitrile, lauroyl peroxide, potassium persulfate, cumene hydroperoxide and p-menthane hydroperoxide.

The polymerization for which the method of this invention can be particularly suitably carried out include, for example, suspension polymerization or emulsion polymerization of vinyl halides such as vinyl chloride or vinylidene halides or a monomer mixture mainly comprised of any of these. The method is also suited to polymerizations for which polymerization vessels made of stainless steel are mainly used, for example, polymerizations for preparing beads or latexes of polymers such as polystyrene, polymethyl methacrylate and polyacrylonitrile, preparing synthetic rubbers such as SBR, NBR, CR, IR and IIR (these synthetic rubbers are commonly prepared by emulsion polymerization), and preparing ABS resins.

EXAMPLES

The method of this invention will be described below in detail by way of Examples and Comparative Examples. In each Table shown below, the experiment numbers marked with an asterisk denote comparative examples, and the other experiment numbers working examples of this invention.

EXAMPLE 1

In each experiment, mixed were an aqueous solution of (a) water-soluble anionic dye and an organic solvent solution of (b) water-insoluble cationic dye so that the total content of (a) water-soluble anionic dye and (b) water-insoluble cationic dye might become 0.1% by weight. The pH was then adjusted by adding phytic acid, and a water-based coating solution was thereby prepared. This water-based coating solution was applied on the inner wall surface, stirrer and other parts with which the monomer comes into contact during polymerization, of a polymerization vessel made of stainless steel, having an inner capacity of 100 liters and equipped with a stirrer, and dried at 50° C. for 15 minutes, followed by washing with water. However, Experiment Nos. 1 to 6 are comparative example, in which no water-based coating solution was applied, or a water-based coating solution did not contain any one of (a)

water-soluble anionic dye and (b) water-insoluble cationic dye or had a pH of more than 7. The (a) water-soluble anionic dye and (b) water-insoluble cationic dye, weight ratio of (a)/(b) in the water-based coating solution, kinds of the organic solvent in which the (b) water-insoluble cationic dye was dissolved, the weight ratio of water/organic solvent in the water-based coating solution, and the pH of the water-based coating solution are shown in Table 1.

Next, into the polymerization vessel thus coated, 26 kg of vinyl chloride, 52 kg of pure water, 26 g of a partially saponified polyvinyl alcohol and 8 g of $\alpha,\alpha'$-dimethylvaleronitrile were charged, and polymerization was then carried out at 58° C. for 10 hours with stirring.

After the polymerization was completed, the quantity of polymer scale sticking on the inner wall surface of the polymerization vessel was measured. Results obtained are shown in Table 1.

was added to adjust the pH to 2.5, and a water-based coating solution was thereby prepared. In preparing this solution, the weight ratio of (a) the water-soluble anionic dye to (b) the water-insoluble cationic dye was controlled as shown in Table 2. The dye and pH adjuster used in each experiment are shown in Table 2. This water-based coating solution was applied on the inner wall surface, stirrer and other parts with which the monomer comes into contact during polymerization, of a polymerization vessel made of stainless steel, having an inner capacity of 100 liters and equipped with a stirrer, and dried at 70° C. for 10 minutes, followed by washing with water. However, in Experiment No. 30, no coating solution was applied.

Next, into the polymerization vessel coated in this way, 24 kg of styrene, 8 kg of acrylonitrile, 40 kg of pure water, 0.8 kg of hydroxyapatite, 16 g of sodium dodecylbenzensulfonate, 160 g of t-dodecylmercaptan and 160 g of benzoyl peroxide were charged, and polymerization was then carried out at 80° C. for 10 hours with stirring to produce a polymer.

After the polymerization was completed, the quantity of polymer scale sticking on the inner wall surface of the polymerization vessel was measured. Results obtained are shown in Table 2.

TABLE 1

| Exp. No. | (a) Water-soluble anionic dye | (b) Water-insoluble Cationic dye | Organic solvent | (a)/(b) (Weight ratio) | Water/organic solvent (Weight ratio) | pH | Scale sticking (g/m$^2$) |
| --- | --- | --- | --- | --- | --- | --- | --- |
| 1* | (Not Coated) | — | — | — | — | — | 1,200 |
| 2* | C.I. Acid Black 2 | — | — | 100/10 | — | 8.0 | 800 |
| 3* | — | C.I. Solvent Black 22 | Methanol | 0/100 | 100/10 | 5.0 | 700 |
| 4* | C.I. Acid Black 2 | C.I. Solvent Black 3 | Acetone | 100/0 | 100/5 | 9.0 | 750 |
| 5* | " | " | " | 100/0.05 | 100/7 | 9.0 | 800 |
| 6* | " | " | " | 100/1100 | 100/7 | 8.0 | 650 |
| 7 | " | C.I. Solvent Black 22 | " | 100/5 | 100/5 | 6.0 | 10 |
| 8 | " | " | " | 100/20 | 100/10 | 2.5 | 2 |
| 9* | " | " | " | " | " | 9.0 | 800 |
| 10 | " | C.I. Solvent Black 3 | Methanol | 100/30 | 100/7 | 3.0 | 0 |
| 11 | " | " | Acetone | 100/40 | 100/5 | 2.5 | 0 |
| 12 | " | C.I. Solvent Black 5 | Methanol | 100/35 | 100/10 | 2.5 | 0 |
| 13 | " | " | " | 100/50 | 100/10 | 3.0 | 0 |
| 14 | C.I. Acid Yellow 38 | " | " | 100/30 | 100/8 | 2.5 | 1 |
| 15 | C.I. Acid Violet 11 | C.I. Solvent Yellow 2 | Acetone | 100/15 | 100/5 | 3.0 | 2 |
| 16 | C.I. Acid Blue 158 | C.I. Solvent Violet 8 | Ethanol | 100/20 | 100/3 | 2.5 | 1 |
| 17 | C.I. Direct Black 38 | C.I. Solvent Brown 3 | Dimethyl formamide | 100/40 | 100/10 | 2.5 | 1 |
| 18 | C.I. Direct Blue 1 | C.I. Solvent Black 7 | Dimethyl sulfoxide | 100/50 | 100/5 | 2.5 | 3 |
| 19 | C.I. Acid Black 2 | " | Acetone | 100/51 | 100/10 | 3.0 | 0 |
| 20 | " | " | Methanol | 100/30 | 100/10 | 2.5 | 0 |
| 21 | " | " | Dimethyl formamide | 100/20 | 100/3 | 3.0 | 0 |
| 22 | C.I. Direct Green 1 | C.I. Solvent Red 24 | Acetone | 100/30 | 100/10 | 2.0 | 1 |
| 23 | C.I. Acid Rede 52 | C.I. Solvent Blue 2 | Ethanol | 100/50 | 100/7 | 2.5 | 2 |
| 24 | C.I. Direct Brown 37 | C.I. Solvent Blue 25 | " | 100/30 | 100/8 | 3.0 | 1 |
| 25 | C.I. Acid Black 1 | C.I. Disperse Red 56 | Methanol | 100/40 | 100/5 | 2.5 | 5 |
| 26 | C.I. Acid Black 2 | C.I. Disperse Orange 5 | " | 100/45 | 100/4 | 2.0 | 0 |
| 27 | " | C.I. Solvent Orange 45 | Ethanol | 100/70 | 100/8 | 3.0 | 1 |
| 28 | C.I. Direct Yellow 1 | C.I. Disperse Black 1 | " | 100/25 | 100/10 | 3.5 | 6 |
| 29 | C.I. Direct Orange 97 | C.I. Disperse Black 26 | Methanol | 100/60 | 100/10 | 2.5 | 4 |

EXAMPLE 2

In each experiment, an aqueous solution of (a) water-soluble anionic dye in 95 parts by weight of water and a solution of (b) water-insoluble cationic dye in 5 parts by weight of methanol were mixed, and a pH adjuster

TABLE 2

| Exp. No. | (a) Water-soluble anionic dye | (b) Water-insoluble cationic dye | (a)/(b) (Weight ratio) | pH Adjuster | Scale sticking (g/m$^2$) |
| --- | --- | --- | --- | --- | --- |
| 30* | (Not Coated) | | — | — | 1,000 |
| 31 | C.I. Acid Black 2 | C.I. Solvent Black 3 | 100/40 | Phosphoric acid | 0 |
| 32 | " | C.I. Solvent Black 5 | 100/25 | Phytic acid | 0 |

TABLE 2-continued

| Exp. No. | (a) Water-soluble anionic dye | (b) Water-insoluble cationic dye | (a)/(b) (Weight ratio) | pH Adjuster | Scale sticking (g/m²) |
|---|---|---|---|---|---|
| 33 | " | C.I. Solvent Black 7 | 100/30 | " | 0 |
| 34 | " | C.I. Solvent Orange 14 | 100/20 | Hydrochloric acid | 3 |
| 35 | " | C.I. Solvent Orange 100 | 100/40 | Sulfuric acid | 0 |
| 36 | " | C.I. Disperse Black 30 | 100/60 | Perchloric acid | 1 |
| 37 | " | C.I. Fluorescent Brightening Agent 162 | 100/50 | " | 10 |
| 38 | C.I. Reactive Yellow 3 | C.I. Solvent Yellow 56 | 100/30 | Phytic acid | 7 |
| 39 | C.I. Direct Red 92 | C.I. Solvent Blue 36 | 100/20 | " | 5 |
| 40 | C.I. Direct Violet 78 | C.I. Solvent Blue 55 | 100/100 | " | 6 |
| 41 | C.I. Solubilized Vat Black 1 | C.I. Disperse Red 100 | 100/70 | " | 5 |
| 42 | C.I. Acid Blue 40 | C.I. Disperse Red 128 | 100/35 | " | 8 |
| 43 | C.I. Acid Blue 113 | C.I. Solvent Black 23 | 100/50 | Hydrochloric acid | 3 |
| 44 | C.I. Direct Black 19 | C.I. Solvent Brown 20 | 100/25 | " | 10 |
| 45 | C.I. Acid Orange 3 | C.I. Solvent Orange 30 | 100/30 | " | 13 |
| 46 | C.I. Acid Black 124 | C.I. Solvent Orange 40 | 100/60 | " | 19 |
| 47 | C.I. Direct Red 1 | C.I. Solvent Violet 21 | 100/20 | " | 20 |
| 48 | C.I. Mordant Black 5 | C.I. Disperse Yellow 50 | 100/100 | Acetic acid | 10 |
| 49 | C.I. Mordant Yellow 26 | C.I. Solvent Blue 73 | 100/50 | " | 15 |
| 50 | C.I. Fluorescent Brightening Agent 30 | C.I. Solvent Blue 11 | 100/20 | " | 20 |
| 51 | C.I. Mordant Violet 5 | C.I. Solvent Blue 2 | 100/50 | Phytic acid | 13 |
| 52 | C.I. Direct Orange 26 | C.I. Solvent Brown 5 | 100/60 | " | 15 |
| 53 | C.I. Acid Blue 1 | C.I. Solvent Red 81 | 100/30 | Phosphoric acid | 15 |
| 54 | C.I. Azoic Brown 2 | C.I. Solvent Orange 44 | 100/5 | " | 17 |

EXAMPLE 3

In each experiment, a water-based coating solution was applied on the inner wall surface, stirrer and other parts with which the monomer comes into contact during polymerization, of a polymerization vessel made of stainless steel having an inner capacity of 100 liters and equipped with a stirrer, and dried by heating under the conditions shown in Table 3, followed by washing with water. However, in Experiment No. 55, no water-based coating solution was applied. The coating solution used in each experiment is the same as that used in the Experiment No. of Examples 1 or 2 shown in Table 3.

Next, into the polymerization vessel thus coated, 27 kg of polybutadiene latex (solid content: 50% by weight), 40 kg of pure water, 7 kg of styrene, 3 kg of acrylonitrile, 62.5 g of t-dodecylmercaptan and 70 g of potassium persulfate were charged, and polymerization was then carried out at 50° C. for 10 hours with stirring to produce a polymer.

After the polymerization was completed, the quantity of polymer scale sticking on the inner wall surface of the polymerization vessel was measured. Results are shown in Table 3.

TABLE 3

| Exp. No. | Coating solution | Drying and heating conditions | Amount of scale sticking (g/m²) |
|---|---|---|---|
| 55* | Not applied | — | 180 |
| 56 | Exp. No. 8 | 50° C. × 15 min | 5 |
| 57 | Exp. No. 10 | 50° C. × 20 min | 0 |
| 58 | Exp. No. 12 | 60° C. × 15 min | 0 |
| 59 | Exp. No. 14 | 70° C. × 10 min | 3 |
| 60 | Exp. No. 20 | 40° C. × 15 min | 2 |
| 61 | Exp. No. 22 | 80° C. × 5 min | 7 |
| 62 | Exp. No. 32 | 50° C. × 15 min | 0 |
| 63 | Exp. No. 39 | 50° C. × 20 min | 10 |
| 64 | Exp. No. 43 | 40° C. × 30 min | 15 |
| 65 | Exp. No. 45 | 60° C. × 10 min | 17 |

EXAMPLE 4

In each experiment, a water-based coating solution was applied on the inner wall surface and other parts with which a monomer comes into contact during polymerization, of a polymerization vessel made of stainless steel having an inner capacity of 100 liters and equipped with a stirrer, and dried at 50° C. for 15 minutes, followed by washing with water. However, the coating solution used in each experiment is the same as that used in the Experiment No. of Examples 1 or 2 shown in Table 4.

Next, into the polymerization vessel thus coated, 3.7 kg of 1.3-butadiene, 1.3 of styrene, 9 kg of pure water, 225 g of sodium dodecylbenzene sulfonate, 14 g of t-dodecylmercaptan and 15 g of potassium persulfate were charged, and polymerization was then carried out at 50° C. for 10 hours with stirring to produce a polymer.

After the polymerization was completed, the quantity of polymer scale sticking on the inner wall surface of the polymerization vessel was measured. Results are shown in Table 4.

TABLE 4

| Exp. No. | Coating solution | Scale sticking (g/m²) |
|---|---|---|
| 66* | Not applied | 430 |
| 67 | Exp. No. 10 | 0 |
| 68 | Exp. No. 12 | 0 |
| 69 | Exp. No. 16 | 2 |
| 70 | Exp. No. 21 | 0 |
| 71 | Exp. No. 27 | 3 |
| 72 | Exp. No. 31 | 0 |
| 73 | Exp. No. 33 | 0 |
| 74 | Exp. No. 36 | 5 |

EXAMPLE 5

In each experiment, the procedure of Example 1 was repeated to carry out polymerization, except that the water-based coating solution as shown in Table 4 was used and the heating and drying after the water-based coating solution was applied were carried out under conditions as shown in Table 5. After the polymerization was completed, the polymer produced was taken out, thereafter the inside of the polymerization vessel was washed with water. The operations of applying the coating solution and carrying out polymerization in the same manner as the above were repeated, and the number of polymerization runs repeated (number of scale-prevented runs) before scale sticking exceeds 1 g/m², was examined. However, Experiment No. 84 is a comparative example in which no coating solution was applied, and the coating solution used in each experiment is the same as that used in Experiment No. of Example 1 shown in Table 5. The results are shown in the Table 5.

TABLE 5

| Exp. No. | Coating solution | Drying and heating conditions | No. of scale-prevented runs |
|---|---|---|---|
| 75 | Exp. No. 10 | 50° C. × 15 min | 50 |
| 76 | Exp. No. 11 | 60° C. × 10 min | 60 |
| 77 | Exp. No. 12 | 70° C. × 5 min | 70 |
| 78 | Exp. No. 13 | 40° C. × 20 min | 85 |
| 79 | Exp. No. 19 | 80° C. × 5 min | 40 |
| 80 | Exp. No. 20 | 50° C. × 20 min | 30 |
| 81 | Exp. No. 21 | 60° C. × 10 min | 20 |
| 82 | Exp. No. 26 | 50° C. × 15 min | 20 |
| 83 | Exp. No. 32 | 50° C. × 20 min | 150 |
| 84* | Not applied | — | 0 |

EXAMPLE 6

In each experiment, mixed were an aqueous solution of (a) water-soluble anionic dye and an organic solvent solution of (b) water-insoluble nitrogen-containing organic compound so that the total content of (a) water-soluble anionic dye and (b) water-insoluble nitrogen-containing organic compound might become 0.1% by weight. The pH was then adjusted by adding phytic acid, and a water-based coating solution was thereby prepared. This water-based coating solution was applied on the inner wall surface, stirrer and other parts with which the monomer comes into contact during polymerization, of a polymerization vessel made of stainless steel, having an inner capacity of 100 liters and equipped with a stirrer, and dried at 50° C. for 15 minutes, followed by washing with water. However, Experiment Nos. 85 to 90 are comparative example, in which no water-based coating solution was applied, or a water-based coating solution did not contain any one of (a) water-soluble anionic dye and (b) water-insoluble nitrogen-containing organic compound or had a pH of more than 7. The (a) water-soluble anionic dye and (b) water-insoluble nitrogen-containing organic compound, weight ratio of (a)/(b) in the water-based coating solution, kinds of the organic solvent in which the (b) water-insoluble nitrogen-containing organic compound was dissolved, the weight ratio of water/organic solvent in the water-based coating solution, and the pH of the water-based coating solution are shown in Table 6.

Next, into the polymerization vessel thus coated, 26 kg of vinyl chloride, 52 kg of pure water, 26 g of a partially saponified polyvinyl alcohol and 8 g of α,α'-dimethylvalerolonitrile were charged, and polymerization was then carried out at 58° C. for 10 hours with stirring.

After the polymerization was completed, the quantity of polymer scale sticking on the inner wall surface of the polymerization vessel was measured. Results obtained are shown in Table 6.

TABLE 6

| | Coating solution | | | | | | |
|---|---|---|---|---|---|---|---|
| | | Organic solvent solution of water-insoluble N-containing compound | | | Water/ | | |
| Exp. No. | (a) Water-soluble anionic dye | (b) Water-insoluble N-containing organic compound | Organic solvent | (a)/(b) (Weight ratio) | organic solvent (Weight ratio) | pH | Scale sticking (g/m²) |
| 85* | (Not applied) | | — | — | — | — | 1,200 |
| 86* | C.I. Acid Black 2 | (None) | (None) | 100/0 | — | 8.0 | 800 |
| 87* | (None) | 1,8-Diaminonaphthalene | Methanol | 0/100 | 100/10 | 2.5 | 900 |
| 88* | C.I. Acid Black 2 | " | " | 100/0 | 100/5 | 9.0 | 850 |
| 89* | " | " | " | 100/0.05 | 100/5 | 9.0 | 900 |
| 90* | " | " | " | 100/1100 | 100/5 | 8.0 | 700 |
| 91 | " | " | " | 100/15 | 100/5 | 2.5 | 0 |
| 92 | " | " | " | 100/20 | 100/10 | 5.0 | 0 |
| 93 | " | α-Naphthylamine | " | 100/13 | 100/5 | 6.0 | 0 |
| 94 | " | " | " | 100/18 | 100/7 | 3.0 | 0 |
| 95 | C.I. Food Yellow 3 | Quinoline | Ethanol | 100/10 | 100/10 | 2.5 | 1 |
| 96 | C.I. Direct Orange 2 | 2-Aminoisoquinoline | " | 100/20 | 100/8 | 2.5 | 3 |
| 97 | C.I. Acid Red 18 | 1,10-Phenanthroline | Methanol | 100/15 | 100/3 | 3.0 | 0 |
| 98 | C.I. Acid Red 73 | 1,5-Diaminonaphthalene | Acetone | 100/20 | 100/5 | 2.5 | 1 |
| 99 | C.I. Acid Blue 116 | α-Aminoanthraquinone | Dimethyl formamide | 100/5 | 100/10 | 3.5 | 5 |
| 100 | C.I. Acid Black 1 | 4-(p-Aminophenol)-1-naphthylamine | Methanol | 100/70 | 100/7 | 2.0 | 3 |
| 101 | C.I. Acid Blue 1 | 1-α-Naphthylthio-semicarbazide | Ethanol | 100/80 | 100/10 | 3.0 | 1 |
| 102 | C.I. Direct Red 92 | Phenothiazine | Methaol | 100/50 | 100/10 | 2.5 | 3 |
| 103 | C.I. Direct Black 32 | 1,1'-Biisoquinoline | " | 100/5 | 100/10 | 2.5 | 2 |
| 104 | C.I. Direct Brown 101 | Phenanthridine | Ethanol | 100/40 | 100/5 | 3.0 | 5 |
| 105 | C.I. Acid Red 87 | 2,3-Diaminophenazine | Formamide | 100/30 | 100/10 | 2.5 | 1 |
| 106 | C.I. Mordant Violet 5 | Cinchonidine | Methanol | 100/50 | 100/6 | 2.5 | 10 |
| 107 | C.I. Reactive Blue 18 | Acronidine | " | 100/40 | 100/5 | 3.0 | 15 |
| 108 | C.I. Acid Violet 78 | Oxychelidonine | Ethanol | 100/20 | 100/7 | 2.5 | 8 |
| 109 | C.I. Direct Orange 97 | 2,3-Aminoquinoline | Dimethyl formamide | 100/15 | 100/8 | 2.0 | 2 |
| 110 | C.I. Direct Green 1 | Burbocapnine | Methanol | 100/30 | 100/10 | 4.0 | 10 |
| 111 | C.I. Acid Blue 40 | Morphothebaine | Ethanol | 100/15 | 100/4 | 3.0 | 15 |
| 112 | C.I. Acid Orange 3 | 1-Aminoacridine | Dimethyl- | 100/10 | 100/10 | 2.5 | 1 |

TABLE 6-continued

| | | Coating solution | | | | | |
|---|---|---|---|---|---|---|---|
| | | Organic solvent solution of water-insoluble N-containing compound | | | | Water/organic | Scale |
| Exp. No. | (a) Water-soluble anionic dye | (b) Water-insoluble N-containing organic compound | Organic solvent | (a)/(b) (Weight ratio) | solvent (Weight ratio) | pH | sticking (g/m$^2$) |
| | | | sulfoxide | | | | |

EXAMPLE 7

In each experiment, an aqueous solution of (a) water-soluble anionic dye in 95 parts by weight of water and an organic solvent solution of (b) water-insoluble nitrogen-containing organic compound in 5 parts by weight of methanol were mixed, and a pH adjuster was added to adjust the pH to 2.5, and a water-based coating solution was thereby prepared. In preparing this solution, the weight ratio of (a) dye to (b) compound was controlled as shown in Table 7. The dye and pH adjuster used in each experiment are shown in Table 7.

This water-based coating solution was applied on the inner wall surface, stirrer and other parts with which the monomer comes into contact during polymerization, of a polymerization vessel made of stainless steel, having an inner capacity of 100 liters and equipped with a stirrer, and dried at 70° C. for 10 minutes, followed by washing with water. However, in Experiment No. 113, no coating solution was applied.

Next, into the polymerization vessel coated in this way, 24 kg of styrene, 8 kg of acrylonitrile, 40 kg of pure water, 0.8 kg of hydroxyapatite, 16 g of sodium dodecylbenzensulfonate, 160 g of t-dodecylmercaptan and 160 g of benzoyl peroxide were charged, and polymerization was then carried out at 80° C. for 10 hours with stirring to produce a polymer.

After the polymerization was completed, the quantity of polymer scale sticking on the inner wall surface of the polymerization vessel was measured. Results obtained are shown in Table 7.

EXAMPLE 8

In each experiment, a water-based coating solution was applied on the inner wall surface, stirrer and other parts with which the monomer comes into contact during polymerization, of a polymerization vessel made of stainless steel having an inner capacity of 100 liters and equipped with a stirrer, and dried at 50° C. for 15 minutes, followed by washing with water. However, in Experiment No. 127, no water-based coating solution was applied. The coating solution used in each experiment is the same as that used in the Experiment No. of Examples 6 or 7 shown in Table 8.

Next, into the polymerization vessel thus coated, 27 kg of polybutadiene latex (solid content: 50% by weight), 40 kg of pure water, 7 kg of styrene, 3 kg of acrylonitrile, 62.5 g of t-dodecylmercaptan and 70 g of potassium persulfate were charged, and polymerization was then carried out at 50° C. for 10 hours with stirring to produce a polymer.

After the polymerization was completed, the quantity of polymer scale sticking on the inner wall surface of the polymerization vessel was measured. Results are shown in Table 8.

TABLE 8

| Exp. No. | Coating solution | Scale sticking (g/m$^2$) |
|---|---|---|
| 127* | Not applied | 180 |
| 128 | Exp. No. 91 | 0 |
| 129 | Exp. No. 93 | 0 |
| 130 | Exp. No. 101 | 5 |
| 131 | Exp. No. 104 | 5 |
| 132 | Exp. No. 116 | 0 |
| 133 | Exp. No. 122 | 0 |

EXAMPLE 9

In each experiment, the procedure of Example 6 was repeated to carry out polymerization, except that the

TABLE 7

| Exp. No. | (a) Anionic dye | (b) Water-insoluble N-containing organic compound | (a)/(b) (Weight ratio) | pH Adjuster | Scale sticking (g/m$^2$) |
|---|---|---|---|---|---|
| 113* | (Not applied) | | — | — | 1,000 |
| 114 | C.I. Acid Black 2 | Phenoxazine | 100/20 | Hydrochloric acid | 3 |
| 115 | " | 2-Anilino-1,4-naphthoquinone | 100/40 | Perchloric acid | 1 |
| 116 | " | β-Aminoanthraquinone | 100/5 | Phytic acid | 0 |
| 117 | C.I. Reactive Blue 4 | N-benzoylnaphthylamine | 100/10 | " | 10 |
| 118 | C.I. Mordant Yellow 26 | 1,4-Diamino-2-methylnaphthalene | 100/15 | Phosphoric acid | 5 |
| 119 | C.I. Acid Black 124 | α,α'-Dinaphthyl-nitrosoamine | 100/10 | Sulfuric acid | 7 |
| 120 | C.I. Direct Violet 1 | 4-Anilnoquinoline | 100/20 | Nitric acid | 15 |
| 121 | C.I. Fluorescent Brightening Agent 32 | 5-Aminoacridine | 100/5 | Hydrochloric acid | 20 |
| 122 | C.I. Acid Black 2 | 1,8-Diaminonaphthalene | 100/10 | Perchloric acid | 0 |
| 123 | C.I. Direct Red 31 | 4-Phenylquinoline | 100/20 | " | 10 |
| 124 | C.I. Direct Blue 6 | Nicotyrine | 100/80 | Phytic acid | 5 |
| 125 | C.I. Acid Blue 158 | 1,1'-Dinaphthylamine | 100/25 | " | 5 |
| 126 | C.I. Acid Blue 59 | N-phenylnaphtylamine | 100/15 | Perchloric acid | 15 | water-based coating solution as shown in Table 9 was used and the heating and drying after the water-based coating solution was applied were carried out under conditions as shown in Table 9. After the polymerization was completed, the polymer produced was taken out, thereafter the inside of the polymerization vessel was washed with water. The operations of applying the coating solution and carrying out polymerization in the same manner as the above were repeated, and the number of polymerization runs repeated (number of scale-prevented runs) before scale sticking exceeds 1 g/m², was examined. However, the coating solution used in each experiment is the same as that used in Experiment No. shown in Table 9.

TABLE 9

| Exp. No. | Coating solution | Drying and heating conditions | No. of scale-prevented runs |
|---|---|---|---|
| 134* | Not applied | — | 0 |
| 135 | Exp. No. 91 | 50° C. × 15 min | 40 |
| 136 | Exp. No. 93 | 60° C. × 15 min | 50 |
| 137 | Exp. No. 97 | 40° C. × 20 min | 45 |
| 138 | Exp. No. 116 | 70° C. × 10 min | 30 |

We claim:

1. A method of preventing polymer scale formation in a polymerization vessel during the polymerization of a chlorine containing monomer having an ethylenically unsaturated double bond consistently essentially of:
polymerizing said monomer in a polymerization vessel in which the inner wall surface thereof is previously coated with a water-based coating solution containing (A) a water-soluble anionic dye and (B) at least one member selected from the group consisting of water-insoluble cationic dyes and water-insoluble nitrogen-containing organic compounds and having a pH of 7 or less and then dried to form a coating.

2. The method according to claim 1, wherein said water-based coating solution contains at least one water-soluble anionic dye selected from the group consisting of C.I. Acid Black 2, C.I. Acid Yellow 38, C.I. Acid Violet 11, C.I. Acid Blue 158, C.I. Direct Black 38, C.I. Direct Blue 1, C.I. Direct Green 1, C.I. Acid Red 52, C.I. Direct Brown 37, C.I. Acid Black 1, C.I. Direct Yellow 1, C.I. Direct Orange 97, C.I. Reactive Yellow 3, C.I. Direct Red 92, C.I. Solubilized Vat Black 1, C.I. Acid Blue 40, C.I. Acid Blue 113, C.I. Food Yellow 3, C.I. Direct Orange 2, C.I. Acid Red 73, C.I. Acid Blue 116, C.I. Acid Black 1, C.I. Acid Blue 1, C.I. Direct Red 92, C.I. Direct Black 32, C.I. Direct Brown 101, C.I. Acid Red 87, C.I. Acid Violet 78, C.I. Direct Orange 97, C.I. Direct Green 1, C.I. Acid Orange 3, C.I. Mordant Yellow 26, C.I. Acid Black 124, C.I. Direct Blue 6, and C.I. Acid Blue 158, C.I. Direct Violet 78 and C.I. Acid Red 18.

3. The method according to claim 2, wherein said water-based coating solution contains at least one water-soluble anionic dye selected from the group consisting of C.I. Acid Black 2, C.I. Acid Yellow 38, C.I. Acid Blue 158, C.I. Direct Black 38, C.I. Direct Green 1, C.I. Direct Brown 37, C.I. Food Yellow 3, C.I. Acid Red 18, C.I. Acid Red 73, C.I. Acid Blue 1, C.I. Acid Red 87 and C.I. Acid Orange 3.

4. The method according to claim 1, wherein said water-based coating solution contains at least one water-insoluble cationic dye selected from the group consisting of C.I. Solvent Black 22, C.I. Solvent Black 3, Solvent Black 5, C.I. Solvent Yellow 2, C.I. Solvent Violet 8, C.I. Solvent Brown 3, C.I. Solvent Black 7, C.I. Solvent Red 24, C.I. Solvent Blue 2, C.I. Solvent Blue 25, C.I. Disperse Red 56, C.I. Disperse Orange 5, C.I. Solvent Orange 45, C.I. Disperse Black 1, C.I. Disperse Black 26, C.I. Solvent Orange 14, C.I. Solvent Orange 100, C.I. Disperse Black 30, C.I. Solvent Yellow 56, C.I. Solvent Blue 35, C.I. Solvent Blue 55, C.I. Disperse Red 100, C.I. Disperse Red 128 and C.I. Solvent Black 23.

5. The method according to claim 4, wherein said water-based coating solution contains at least one water-insoluble cationic dye selected from the group consisting of C.I. Solvent Black 3, C.I. Solvent Black 5, C.I. Solvent Violet 8, C.I. Solvent Brown 3, C.I. Solvent Black 7, C.I. Solvent Red 24, C.I. Solvent Blue 25, C.I. Disperse Orange 5, C.I. Disperse Orange 45, C.I. Solvent Orange 100 and C.I. Disperse Black 30.

6. The method according to claim 1, wherein said water-based coating solution contains at least one water-insoluble nitrogen-containing organic compound selected from the group consisting of 1,8-diaminonaphthalene, alpha-naphthylamine, quinoline, 2-aminoisoquinoline, 1,10-phenanthroline, 1,5-diaminonaphthalene, alpha-anthraquinone, 4-(p-aminophenyl)-1-naphthylamine, 1-alpha-naphthylthiosemicarbazide, phenoxazine, 1,1'-biisoquinoline, phenanthridine, 2,3-diaminophenazine, oxychelidonine, 2,3-aminoquinoline, 1-aminoacridine, phenoxazine, 2-anilino-1,4-naphthoquinone, beta-aminoanthraquinone, 1,4'-diamino-2-methylnaphthalene, alpha,alpha'-dinaphthylnitrosoamine, nicotyrine and 1,1'-dinaphthylamine.

7. The method according to claim 6, wherein said water-based coating solution contains at least one water-insoluble nitrogen-containing organic compound selected from the group consisting of 1,8-diaminonaphthalene, alpha-naphthylamine, quinoline, 1,10-phenanthroline, 1,5-diaminonaphthalene, 1-alpha-naphthylthiosemicarbazide, 2,3-diaminophenazine, 1-aminoacridine, 2-anilino-1,4-naphthoquinone and beta-aminoanthraquinone.

8. The method according to claim 1, wherein said water-based coating solution has a pH of from 1.6 to 6.0.

9. The method according to claim 8, wherein said component (B) is mainly comprised of a water-insoluble cationic dye, and said water-based coating solution has a pH of from 1.5 to 3.5.

10. The method according to claim 1, wherein said water-based coating solution contains said (A) component and said (B) component in a total concentration of from 0.01 to 5% by weight.

11. The method according to claim 1, wherein said water-based coating solution contains said (A) component and said (B) component in an (A)/(B) weight ratio of from 100/0.1 to 100/1,000.

12. The method according to claim 11, wherein said (A)/(B) weight ratio is in a range of from 100/3 to 100/100.

13. The method according to claim 1, wherein said water-based coating solution contains water and an organic solvent, the weight ratio of the water/the organic solvent being in a range of from 100/1 to 100/1,000.

14. The method according to claim 13, wherein said component (B) is mainly comprised of an water-insoluble cationic dye, and the weight ratio of the water/the organic solvent is in a range of from 100/1 to 100/30.

15. The method according to claim 1, wherein said water-based coating solution has been previously applied to parts of the polymerization vessel with which the monomer comes to contact during polymerization other than its inner wall surface and then dried to form a coating.

16. The method according to claim 15, wherein said parts with which the monomer comes into contact are selected from the group consisting of a stirring shaft, stirring blade, baffle, header, search coil and condenser.

17. The method according to claim 1, wherein said water-based coating solution has been further previously applied to parts of the recovery system of an unreacted monomer with which the monomer comes to contact during polymerization and then dried to form a coating.

18. The method according to claim 1, wherein the coating formed has a coating weight of from 0.001 to 5 g/m$^2$.

19. The method according to claim 1, wherein the monomer is at least one member selected from the group consisting of vinyl chlorides and chlorinated vinylidenes.

20. The method according to claim 1, wherein said polymerization is carried out as suspension polymerization, emulsion polymerization, solution polymerization or bulk polymerization.

21. The method according to claim 1, wherein the (A) water-soluble anionic dye is C.I. Acid Black 2, the (B) water-insoluble compound is C.I. Solvent Black 3, 5 or 7, the pH adjuster is phytic acid or perchloric acid, and the pH of the coating solution is in the range of from 1.5 to 6.0.

* * * * *